United States Patent Office 2,814,702
Patented Nov. 26, 1957

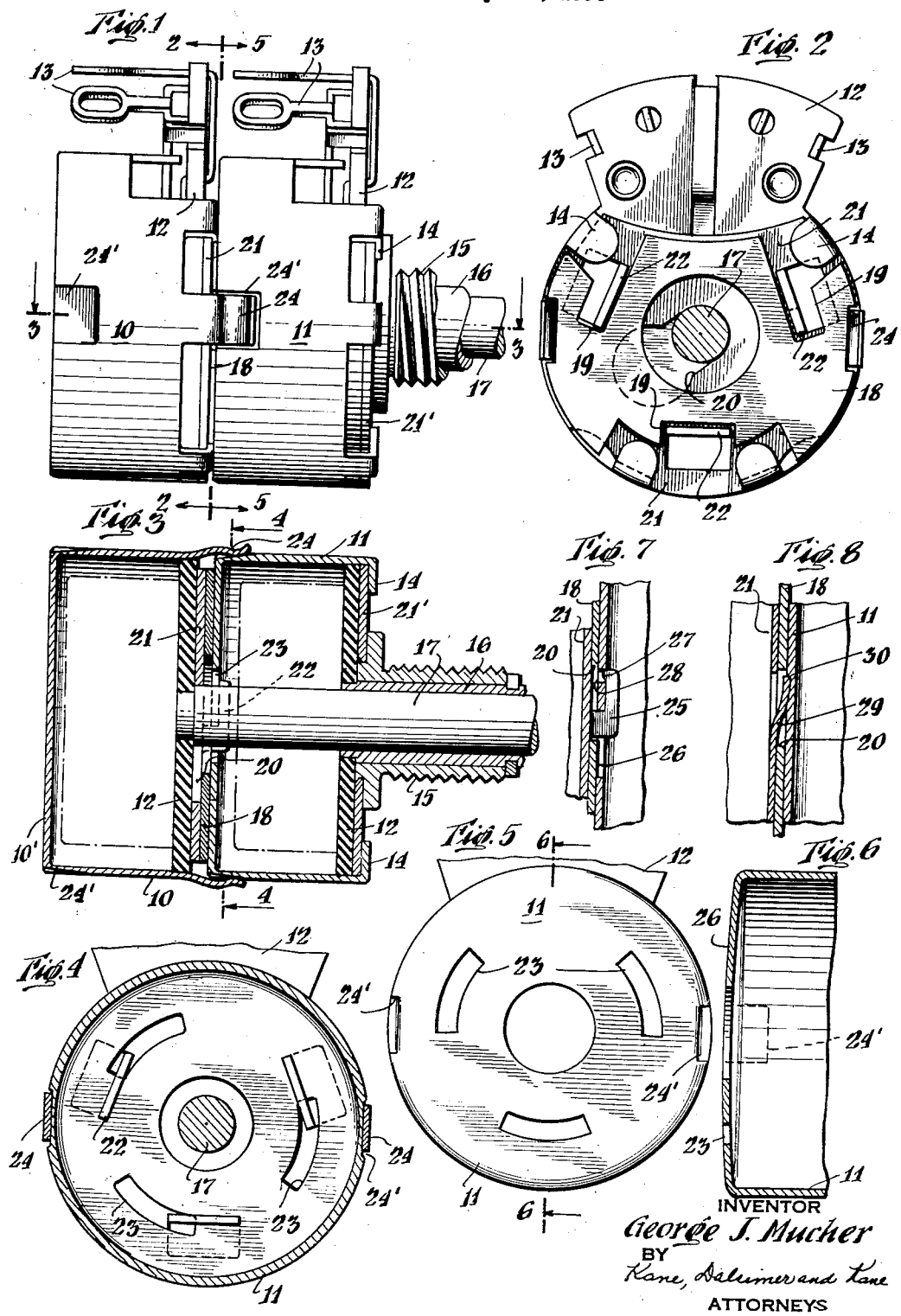

2,814,702

COUPLING FOR ELECTRICAL CONTROLS

George J. Mucher, Rochester, N. H., assignor to Clarostat Mfg. Co., Inc., Dover, N. H., a corporation of New York Application September 2, 1954, Serial No. 453,869

6 Claims. (Cl. 200—168)

This invention relates to a structurally and functionally improved control coupling such as potentiometers, variable resistances, switches, etc.

It is an object of the invention to furnish a structure of this type capable of use with a pair or greater number of control casings and which casings enclose similar, or dissimilar units. Accordingly, a dual or multiple connecting structure is furnished and in which the casings of the units are preferably concentrically disposed.

Another object is that of furnishing a coupling for the casings of control units and which coupling will be capable of ready manipulation without the use of tools to permit of a ready separation or detachment of the casings under most forms of construction. In any event, a coupling will also be provided in which different casings for electrical control units may readily be connected with each other merely by finger manipulation of the operator to furnish a compact and rigid assembly.

Accordingly, it will be feasible to test a unit and then, without tools, to readily assembly that unit and its casing within a grouping of other units to occupy a minimum amount of space and to be properly disposed one with respect to the other.

Additionally, by the present teachings a coupling is furnished which may be provided at nominal cost and largely by the use of automatic machinery; that coupling in addition to permitting a ready connecting or disconnecting of the unit casings, also functioning for virtually indefinite periods of time to maintain the parts properly assembled with respect to each other.

With these and other objects in mind reference is had to the attached sheet of drawings illustrating practical embodiments of the invention and in which:

Fig. 1 is a side elevation of a dual casing arrangement for electrical controls;

Fig. 2 is a transverse sectional view taken along the line 2—2 in the direction of the arrows as indicated in Fig. 1;

Fig. 3 is a sectional plan view taken along the line 3—3 and also in the direction of the arrows as indicated in Fig. 1;

Fig. 4 is a transverse sectional view taken along the line 4—4 in the direction of the arrows as indicated in Fig. 3;

Fig. 5 is a transverse sectional view taken along the lines 5—5 in the direction of the arrows as indicated in Fig. 1;

Fig. 6 is a transverse sectional view taken along the lines 6—6 in the direction of the arrows as indicated in Fig. 5;

Fig. 7 is a fragmentary sectional view of an alternative form of coupling structure; and Fig. 8 is a view similar to Fig. 7 but showing a still further form of structure.

Referring primarily to Figs. 1, 2, 4 and 5 the reference numerals 10 and 11 indicate cup-shaped casings ordinarily formed of metal and each containing parts controlling the operation of an electrical circuit or circuits. Such mechanisms may be variable resistances, potentiometers or other forms of electrical controls such as switches. For the sake of simplicity, only casings 10 and 11 have been illustrated. It is apparent that a far greater number of casings might be present in a given assembly. Conveniently base portions 12 of insulating material extend beyond the casings and mount terminals 13 for connection with the leads extending from given circuits. The free edge portions of the casings may be provided with projections or tongues which are turned in as at 14 in order to retain the bases 12 and the elements associated with the latter. The entire assembly may be mounted by, for example, providing a bushing 15 which is externally threaded to project through the opening of a supporting panel and be clamped in position by means of a nut. An operating shaft in the form of a sleeve may control the mechanism within casing 11, while an internal shaft 17 controls the operation of the mechanism within casing 10.

A spacer plate 18, as shown especially in Fig. 2, is formed with a number of openings 19 beyond its center. Also, it is formed with a central opening 20. The latter serves to permit of the passage of shaft 17. A plate 21 is arranged adjacent base 12. It is against the outer face of this plate that tongues 14 bear in order to retain it against displacement. Spacer plate 18 is simply interposed between the outer face of plate 21 and the base portion of casing 11. Plate 21 is provided with hook-shaped retaining elements 22 projecting perpendicular from its surface. These elements extend through the openings or notches 19 of plate 18. The base portion of casing 11 is formed with openings 23 of sufficient length such that they may receive the series of retaining elements 22. It is thus apparent that with spacer plate 18 in position, casings 10 and 11 may be moved toward each other to cause elements 22 to extend through openings 19 and 23 into the interior of casing 11. Thereupon, by relatively rotating casings 10 and 11, these elements are caused to override the base surface of the second casing and bear against the same to prevent a separation of the parts as shown in Figs. 3 and 4.

Incidentally, it may be noted that in Fig. 3 a casing 10' has been shown rather than 10. This indicates that a casing may be present which, for example, controls a switch auxiliary to the mechanism contained within casing 11. Under these circumstances only a single operating shaft 17' need be employed. Also, in this view, the outermost plate associated with casing 11 has been indicated by the reference numeral 21' in that it does not carry a series of retaining elements 22.

It will of course be understood that spacer plates 18 need not necessarily be employed. However, they materially contribute to the efficiency of the coupling. In this connection, it will be appreciated that they furnish a flat bearing surface intervening control assemblies. Also, and as shown in Fig. 6, in a somewhat exaggerated manner, the base portion of a casing might be bulged as at 26, or otherwise include irregularities which would detract from an effective coupling and retention of one casing with respect to the other. With the spacer plates in position any such bulging or irregularities will in effect furnish an elastic or yielding structure so that the inner edges of the elements 22 will yieldingly and frictionally bear against the inner casing face adjacent the openings 23 and included in a base surface.

To further assure a retention of the part against axial displacement, detent assemblies are preferably utilized. These are shown in Figs. 1 to 6 inclusive, and may include projecting portions 24, extending outwardly from casing 10 or any casings disposed inwardly of the latter.

These projections will embrace a certain amount of resiliency and will be shaped so that they will override the outer face of the adjacent casing 11 as the latter is moved axially towards casing 10. The casing 11, as well as the base portion of casing 10 adjacent its base, are formed with notches or recesses 24'. Therefore, as the casings are rotated to establish proper registry of the several components, these tongues, or projections 24, will lodge within the recesses 24' to thus latch the parts in proper positions. Of course if it is desired to detach the casings from each other, these latches may readily be released, the casings may again be rotated with respect to each other and then physically separated.

As shown in Fig. 7, hook-shaped detent element 25 may be employed in lieu of element 22 and tongues or projections 24. They will extend from the same positions as element 22 and each pass through opening 26 corresponding to openings 23. The free ends of the element may each be provided with a protruding portion 27. This will enter an opening or recess 28 formed adjacent opening 26. It is obvious that as axial rotation of the casings is resorted to, these protuberances will cam over the surface of the adjacent casing base and ride into openings 28. Therefore, they will be retained against accidental displacement.

Of course if a permanent locking of the parts is desired, then in addition to elements such as 22 or 25, plate 21 may carry pawls 29 as in Fig. 8 and these pawls will extend through the notches or openings in plate 18. In the outer face of the base of casing 11, recesses or notches 30 are formed. These are properly spaced and related to the openings 23 or 26 and especially the retaining elements such as 22. Therefore, when the latter reach a proper position with reference to the surface adjacent the openings through which they pass, pawls 29 will enter recesses 30 to lock the parts against further rotation. In this manner the assembly is secured against accidental detachment of its several components.

Thus, among others the objects of the invention as specifically aforenoted are achieved. Obviously numerous changes in construction and rearrangements of the parts may be resorted to without departing from the spirit of the invention as defined by the claims.

What is claimed is:

1. In combination a plurality of assemblies, each of said assemblies comprising a separate casing enclosing a separate mechanism to control electric circuits, said casings being disposed in axial alignment and adjacent each other, an operating shaft connected to the mechanism of one assembly and extending through and beyond a second assembly in line with the casing axes, retaining elements extending from one assembly at points spaced around said shaft, the second assembly being formed with similarly spaced openings each receiving one of said retaining elements upon said assemblies being moved towards each other and means forming a part of said elements for automatically locking said assemblies against detachment in response to one of said assemblies being axially rotated with respect to the other.

2. In a combination as specified in claim 1, each of said retaining elements comprising a hook-shaped member to enter the opening of the second assembly to have its end portion overlie and bear against an inner surface of such latter assembly.

3. In a combination as set forth in claim 2, a protruding portion forming a part of each of said elements and the surface of the second assembly being formed with a recess adjacent an opening, said recess receiving said protruding part upon such axial rotation occurring to provide a detent structure restraining said assemblies from relative rotation in an opposite direction.

4. In a combination as specified in claim 1, and locking means preventing a subsequent relative rotation of said assemblies in a direction opposite to that resulting in their locking.

5. In a combination as specified in claim 1, said casings including side walls extending substantially parallel to said shaft and a plurality of retaining portions extending from one casing to bear against the side wall of an adjacent casing.

6. In a combination as specified in claim 5, said retaining portions being formed of resilient material and the side wall of the adjacent casing being formed with recesses to receive said portions.

References Cited in the file of this patent
UNITED STATES PATENTS

| | | |
|---|---|---|
| 2,110,132 | Douglas | Mar. 8, 1938 |
| 2,329,442 | Popp | Sept. 14, 1943 |
| 2,434,248 | Mucher | Jan. 13, 1948 |
| 2,472,586 | Harvey | June 7, 1948 |
| 2,572,651 | Mucher | Oct. 23, 1951 |